US009569445B2

(12) United States Patent
Flores et al.

(10) Patent No.: US 9,569,445 B2
(45) Date of Patent: Feb. 14, 2017

(54) DYNAMIC ASSET ASSEMBLY USING A RULE BASED METHODOLOGY (71) Applicant: International Business Machines Corporation, Armonk, NY (US)

(72) Inventors: Romelia H. Flores, Keller, TX (US); Leonard S. Hand, Red Creek, NY (US); Pratik A. Naik, Dallas, TX (US); Sridhar Nelluvai Sasidharan, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 14/319,928

(22) Filed: Jun. 30, 2014

(65) Prior Publication Data
US 2015/0379025 A1 Dec. 31, 2015

(51) Int. Cl.
*G06F 17/30* (2006.01)
(52) U.S. Cl.
CPC ... *G06F 17/30082* (2013.01); *G06F 17/30141* (2013.01); *G06F 17/30525* (2013.01); *G06F 17/30917* (2013.01)
(58) Field of Classification Search
CPC .............. G06F 17/30082; G06F 17/30525; G06F 17/30141; G06F 17/30917; G06F 17/30085; G06F 17/300194
USPC ............................................. 707/694
See application file for complete search history.

(56) References Cited

U.S. PATENT DOCUMENTS

| 7,716,191 | B2 * | 5/2010 | Blumenau et al. | 707/694 |
|---|---|---|---|---|
| 2006/0106814 | A1 * | 5/2006 | Blumenau et al. | 707/10 |
| 2008/0288944 | A1 * | 11/2008 | Coqueret et al. | 718/100 |
| 2009/0089344 | A1 * | 4/2009 | Brown et al. | 707/205 |
| 2012/0054219 | A1 | 3/2012 | Narendra et al. | |
| 2012/0095926 | A1 * | 4/2012 | Nishimura et al. | 705/301 |
| 2012/0297445 | A1 * | 11/2012 | Nishimura et al. | 726/1 |
| 2013/0304717 | A1 | 11/2013 | Goli et al. | |

OTHER PUBLICATIONS

Shih-Wei Chou et al., Facilitating knowledge creation by knowledge assets, Year: 2004, IEEE, 10 pages.*

* cited by examiner

*Primary Examiner* — Jean B Fleurantin
(74) *Attorney, Agent, or Firm* — Maeve Carpenter (57) ABSTRACT

In an approach for creating an asset, a computer receives a selection of at least one asset element and determines whether one or more asset elements are associated with the selected asset element. In response to determining one or more asset elements are associated with the selected asset element, the computer determines, based, at least in part, on one or more linkage rules, whether one or more of the associated asset elements are in the asset. Furthermore, in response to determining that at least one of the associated asset elements is in the asset, the computer generates an asset map. The asset map, generated by the computer for the asset, depicts the linkage rules, the selected asset elements, and the associated asset elements in the asset.

20 Claims, 5 Drawing Sheets

DYNAMIC ASSET ASSEMBLY USING A RULE BASED METHODOLOGY

BACKGROUND

The present invention relates generally to the field of digital asset management, and more particularly to digital asset creation and re-use in an asset system.

Recently companies have been interested in evolving tools for digital asset systems and asset repositories for rapid and efficient consumption of the digital assets by users or asset consumers. Assets include for example, electronic documents, presentations, models and similar electronic data or files that a company uses or creates to represent architectural systems, technological information, market strategy, financial direction or other intellectual capital for the company.

SUMMARY

Embodiments of the present invention disclose a method, a computer program product, and a computer system for creating an asset. In an embodiment, the computer receives a selection of at least one asset element and determines whether one or more asset elements are associated with the at least one selected asset element. Responsive to determining one or more asset elements are associated with the at least one selected asset element, the computer determines, based, at least in part, on one or more linkage rules, whether one or more of the one or more associated asset elements are in the asset. Furthermore, in response to determining that at least one of the one or more associated asset elements is in the asset, the computer generates an asset map. The asset map depicts the linkage rules, the at least one selected asset element and the one or more associated asset elements in the asset.

DETAILED DESCRIPTION

Embodiments of the present invention recognize that the creation and re-use of complex asset assemblies provides challenges to traditional programs and systems in the identification of desired information or portions of assets, and with identification of any linked or associated asset information to the asset. An asset may be composed of asset elements, or portions of an asset, such as chapters or paragraphs in a book. A selected asset element may be an asset element created by a program, such as a document creation program, or a portion of an asset element previously created, and retrieved from an asset database for inclusion in a new asset. A linked asset element may be connected by hard links to a selected asset element or to another asset element linked to the selected asset element. An associated asset element may be related to or associated with a selected or linked asset element by domains, tags, hard links or soft links, or other data relationships. An example of associated asset elements could be three slides (e.g. asset elements) in an asset database soft linked as a group of related slides in a presentation.

An associated asset element containing information associated with the selected asset elements, such as models, files, or other related content, provides extended relationships to the selected asset elements by using domains, tags, rules, hard links and soft links to the selected asset elements and other linked asset elements. A user creating an asset may choose to remove all associated information or asset elements, keep all associated information or asset elements, keep only the links to the associated information, or manually and individually determine the deposition of each of the associated asset elements with information related to the asset or linked to the asset. Each of these choices creates a different challenge or quality outcome, either in terms of lost content, too much content, or lost time for the user creating a desired asset.

Embodiments of the present invention provide a method, a computer program product, and a system for a user to automatically create and re-use an asset composed of asset elements which may have complex relationships and linkages to other associated information or additional asset elements not selected for use in the asset. Embodiments of the present invention provide a method to automatically maintain desired information and related asset content for asset elements associated with or linked to asset elements selected for the asset using a rules driven selection process. A dynamic asset assembly program provides prioritized rules as filters to automatically determine the desired relationships or links for non-selected asset elements with related asset content, and in addition provides the user with an ability to further customize, select, and control related asset content or associated asset elements not selected for inclusion in the asset. A dynamic asset assembly program assembles an asset, such as a document, presentation, or other electronic data or files, using user identified asset elements and programmatically determined associated or linked asset elements utilizing a rules driven process. The assembly also includes the ability to provide asset customization before asset finalization. The method proposed for the dynamic asset assembly program, using an automated, rules driven selection process, may efficiently and intelligently determine and create an asset with the user desired related content.

Figure 1:
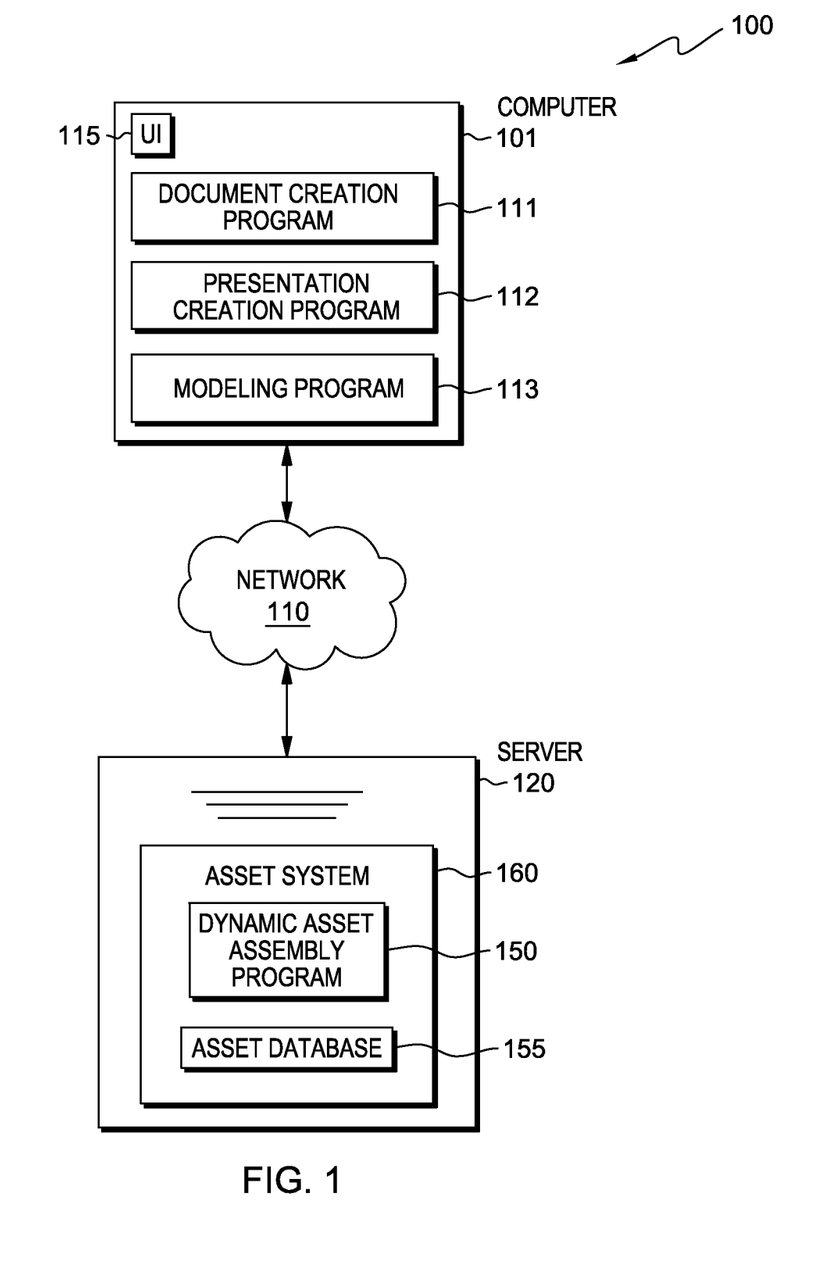
FIG. 1 is a functional block diagram illustrating a data processing environment for a dynamic asset assembly, in accordance with an embodiment of the present invention.

The present invention will now be described in detail with reference to the Figures. FIG. 1 is a functional block diagram illustrating a data processing environment, generally designated 100, including a dynamic asset assembly program for asset creation using a rule based methodology, in accordance with one embodiment of the present invention. Data processing environment 100 includes computer 101 and server 120 connected via network 110.

Network 110 may be implemented as a local area network (LAN), a virtual LAN (VLAN), a wide area network (WAN) such as the Internet, or a combination of these, and can include wired, wireless, or fiber optic connections. In general, network 110 can be any combination of connections and protocols that will support communications between computer 101 and server 120.

Computer 101 may be a laptop computer, a tablet computer, a netbook computer, a personal computer (PC), a desktop computer, a personal digital assistant (PDA), a smart phone, or any programmable electronic device capable of communicating with server 120 over network 110. While in FIG. 1 only one computer, computer 101, is shown, computer 101 can represent one or multiple computers that may be used in conjunction with server 120. Computer 101 includes user interface (UI) 115 to display information and receive information or directions from a user of computer 101. Computer 101 also includes programs such as document creation program 111, which may be a word processing application, presentation creation program 112, and modeling program 113, which each may be used for initial asset element or asset creation. Program 111, 112, and 113 may be displayed on UI 115 such that a user of computer 101 may interact with each program. In addition, UI 115 may be a web-based UI resulting from interactions with server 120. For example, using document creation program 111, the user may create a section of a book, such as a chapter, which is an asset element of the book. Modeling program 113 may be, for example, an electrical simulation program or mechanical stress modeling program. Computer 101 includes internal and external hardware components, as depicted and described in further detail with respect to FIG. 5.

Server 120 may be, for example, an application server, a web server, or any other electronic device or computer system capable of receiving and sending data. In another embodiment, server 120 is a primary server for a computer system utilizing clustered computers and components to act as a single pool of seamless resources when accessed through network 110. Server 120 can be a distributed computing environment utilizing clustered computers and components that act as a single pool of seamless resources, as is common in data centers and with cloud computing applications or "cloud". Server 120 includes asset system 160, which may receive and send electronic data including files, documents, presentations, models, and electronic notifications, including, for example, e-mail, text, or similar notifications from and to computer 101 and other client computing devices (not shown). Electronic data or files, such as documents, presentations or models, may be assets or asset elements stored on server 120 in asset database 155. Asset system 160 includes dynamic asset assembly program 150 and asset database 155.

Asset system 160 performs maintenance and security including monitoring, tracking, and metrics on asset usage. Asset system 160 utilizes dynamic asset assembly program 150 to receive electronic data, ingest file content into asset elements, to send the ingested asset to asset database 155, and to retrieve assets or asset elements from asset database 155 for re-use or consumption creating new assets. Asset system 160 may receive and send electronic data, files, documents and electronic notifications to computer 101 via network 110. In addition, asset system 160 performs maintenance and security, including verification of user access, monitoring, tracking, and metrics on asset usage.

Dynamic asset assembly program 150 receives assets from a user via network 110 for entry into asset database 155. Asset elements are defined and customized by the user to create an asset. Dynamic asset assembly program 150 can also create new assets by retrieving one or more asset elements for re-use from asset database 155. Dynamic asset assembly program 150 applies, to each of the identified asset elements, domains, tags, and rules defining the asset elements and the association of each of the asset elements to other asset elements received as input through the user interface. Dynamic asset assembly program 150 determines the asset elements to be included as a part of the final asset according to the linkage rules configured by the user received via UI 115.

To create an asset by re-using asset elements in asset database 155, dynamic asset assembly program 150 retrieves user selected asset elements from the database. Dynamic asset assembly program 150 creates the asset by re-using one or more asset elements selected via UI 115 along with the associated or linked asset elements retrieved from asset database 155. Dynamic asset assembly program 150 determines, by applying user provided linkage rules, the asset elements associated or linked to the user selected asset elements included in the asset. Upon applying the linkage rules to the associated or linked asset elements, dynamic asset assembly program 150 displays the resulting asset map which shows for the asset; the selected asset elements, the associated asset elements (e.g. associated to the selected asset elements by domains, tags, soft links or element rules) determined by the linkage rules for inclusion in the asset, and the linkage rules applied to the asset elements for asset assembly. The asset map provides the user a visualization of the created asset and the asset elements included (or excluded) in the asset. The asset map shows the linkage rules and the order in which they may be applied to determine the asset. In the exemplary embodiment, dynamic asset assembly program 150 may alter or further customize the asset displayed in the asset map by changing, rejecting, augmenting or moving (e.g. changing the order) the linkage rules. In an embodiment, dynamic asset assembly program 150 utilizes the asset map to customize or change the asset.

Asset database 155 in asset system 160 stores assets containing asset elements. An asset may be stored as a single entity or, an asset may be composed of multiple asset elements which are granular elements or sections of the asset or a subset of an asset. For example, an asset may be a presentation and an asset element may be a slide in the presentation. Asset database 155 receives assets, asset elements, identified relationships (e.g. soft links), domains, tags, and the element rules used for asset assembly in dynamic asset assembly program 150. Associated asset elements are asset elements not selected by the user for the asset but, related or associated by soft links or other rule based association to a selected asset element in an asset. Rule based associations can be created with user direction when submitting an asset to the asset database 155 or after removal of asset elements from asset database 155 at asset creation (e.g. asset re-use). For example, associated asset elements could be defined by the user with rules such as linkage rules as the asset elements in the domain "New Products" that include a date tag of one month or less. In response, dynamic asset assembly program 150 automatically includes the asset elements, associated to the user selected asset elements, less than one month old in "New Products" domain in the asset. The associated asset elements included in an asset by dynamic asset assembly program 150 may be determined by the linkage rules used in asset assembly. Dynamic asset assembly program 150 may retrieve assets and asset elements from asset database 155.

In the exemplary embodiment, asset database 155 resides on server 120, however, in another embodiment, asset database 155 may reside on another server, a group of servers, or a distributed computing environment utilizing clustered computers and components that act as a single pool of seamless resources, as is common in data centers and with cloud computing applications or "cloud" and assets and asset elements may be received or retrieved via network 110.

Figure 2:
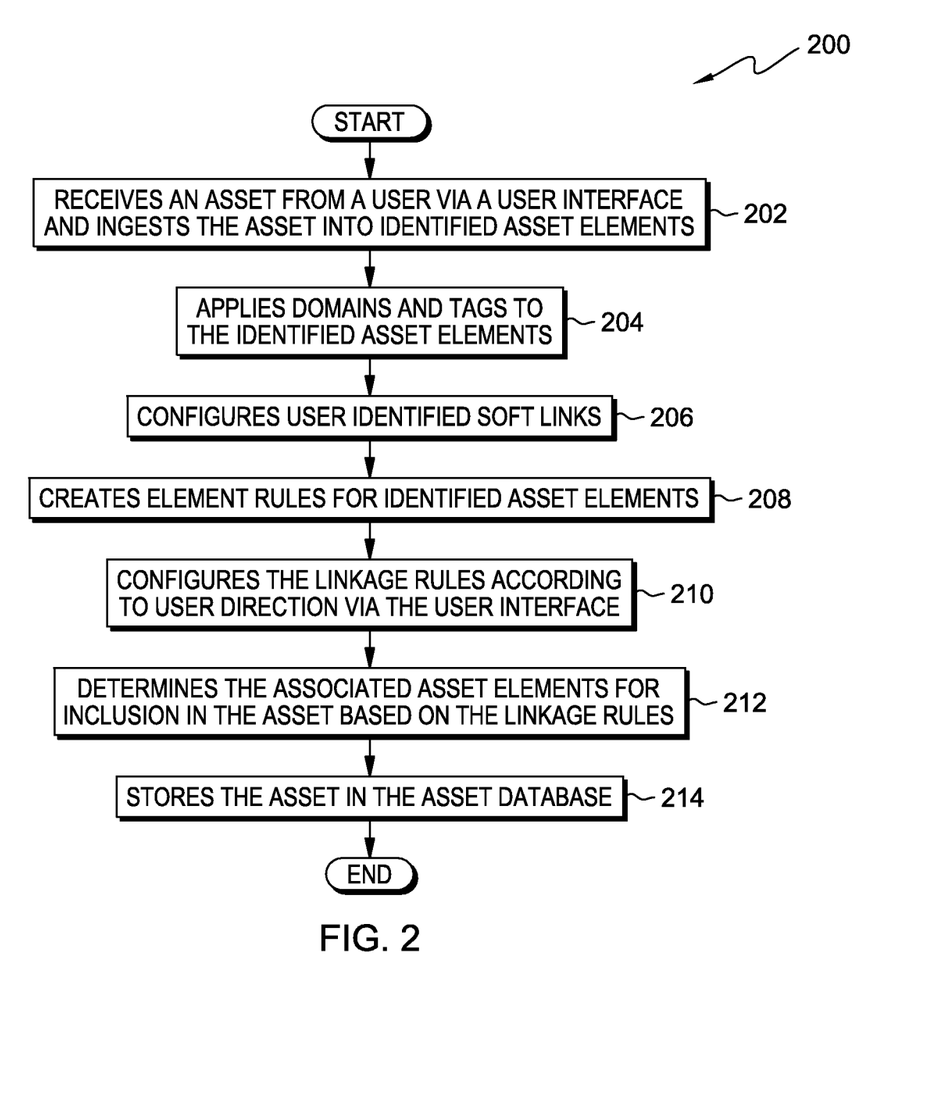
FIG. 2 is a flow chart depicting the initial operational steps of a dynamic asset assembly program within the data processing environment of FIG. 1, to create a new asset using a rule based methodology, in accordance with an embodiment of the present invention.

FIG. 2 is a flow chart 200 depicting initial operational steps of dynamic asset assembly program 150 within data processing environment 100, to create a new asset using a rule based methodology, in accordance with an embodiment of the present invention. FIG. 2 depicts how dynamic asset assembly program 150 may receive an asset for creation or storage from a computer using programs such as document creation program 111, presentation creation program 112 or modeling program 113.

In step 202, dynamic asset assembly program 150 receives an asset from a user via a user interface and ingests the asset into identified asset elements. Dynamic asset assembly program 150 receives, from computer 101 by user interface input via, for example, a web-based browser, or programmatically, for example, via program logic which submits an asset on behalf of the user. The asset may be created on document creation program 111, for example. The asset may be a document, a presentation, a model or other similar electronic data for ingestion or submission into an asset repository or asset system such as asset system 160.

As may be known to one skilled in the art, the asset may be received and ingested into the asset system 160 by separating the asset into user identified asset elements to aide in asset storage and re-use. Asset elements are granular elements of an asset, for example, in an asset such as a document or book, an asset element may be a part (e.g. part 1), a chapter or a paragraph. The user submitting an asset may identify the granular elements of the asset by highlighting or selecting the sections of the electronic data, for example, a slide in a presentation, using a tab or pull down menu to identify the asset element selected as a slide in the asset or presentation.

Dynamic asset assembly program 150 creates hard links for the asset elements selected or input for the asset. Hard links, commonly used, are the most direct links or relationships the asset elements have within an asset. The hard links which are inherent to an asset for assembly, link the selected asset elements. In the document example, each of the asset elements in the asset (e.g. parts, chapters and paragraphs) would be hard linked within the asset as it is ingested into dynamic asset assembly program 150. Dynamic asset assembly program 150 initially preserves the asset elements hard linked to a selected asset element during asset ingestion.

In step 204, dynamic asset assembly program 150 applies domains and tags to the identified asset elements. Asset elements ingested may have additional associations such as domains and tags as identified at asset submission or ingestion by a user interface. A domain identification determines how the asset elements may be placed or located in asset database 155. In various embodiments, domain identification may include either system based domains or user based domains. System based domains, as defined by the system, may include asset classification including security, standards or document type for an asset. For example, a file such as a "DOC" type file may be received from UI 115 via network 110, and dynamic asset assembly program 150 classifies the system based domain as a "DOC" type file and stores the asset and each of the identified asset elements with other "DOC" type assets in asset database 155. In addition, dynamic asset assembly program 150 may include user domains for an asset. User based domains may be user identified domains such as "Marketing", "First Quarter Financials" or "Technical Specifications" that also provide a location of an asset based on topics or a similar grouping in the asset database. The domain identification may be used at asset re-use to determine if asset elements associated with the user selected asset elements may be included (or excluded) in an asset, based on the applied linkage rules for asset assembly.

Dynamic asset assembly program 150 may apply system tags for an asset as identified by UI 115 at asset submission. In response, dynamic asset assembly program 150 enables the system tags for each of the asset elements. The system tags include but, are not limited to the following: the date of the element creation, the number of reviews, the number of re-uses, the users re-using the element, the author, etc. System tags such as number of times the asset element is used or the asset element age (i.e. 3 months old) may and usually do change over time. In the exemplary embodiment, dynamic asset assembly program 150 applies the system tags to user identified asset elements in an asset at ingestion or asset submission.

In step 206, dynamic asset assembly program 150 configures the user identified soft links. As may be known to one skilled in the art, dynamic asset assembly program 150 provides the ability to link or associate one or more asset elements which may be grouped together by soft links for storage in an asset system such as in asset database 155 in asset system 160. Dynamic asset assembly program 150 receives the user defined soft links between one asset element and another asset element and configures the soft links. A soft link, which may also be known as a symbolic link, creates a relationship from one asset element to another asset element that is not encoded (e.g. hard linked) within the asset but is established by other criteria. An example of a soft link may be three slides on DNA replication which may be grouped together, as identified by a user via UI 115, by soft links in asset system 160. Soft links enable the set of slides to be grouped together by topic or domain. For example, only the first slide of the three slides on DNA replication may be selected for a presentation and will be hard linked to the presentation, however, the remaining two slides on DNA replication may be soft linked to the asset and may be included in the final asset depending on the linkage rules applied to the asset. Dynamic asset assembly program 150 determines, using linkage rules, if the soft links should be applied to the asset. If dynamic asset assembly program 150 determines soft links should be applied based on the application of the linkage rules, then, the soft links will be converted to hard links when creating the customized asset for reuse.

In step 208, dynamic asset assembly program 150 creates element rules for the identified asset elements. Element rules are user determined directives for an asset element in an asset that will be executed if the asset element is selected. During asset ingestion, dynamic asset assembly program 150 may receive from a user via UI 115, element rules for a specified asset element. For example, an element rule could be: if element9 and element10 are selected, then, element11 should be included. In various embodiments, element rules override actions directed by the application of the linkage rules.

In step 210, dynamic asset assembly program 150 configures linkage rules according to user directions received via the user interface. Dynamic asset assembly program 150 receives the linkage rules via UI 115 and configures the linkage rules for the asset. The linkage rules apply when an asset is assembled.

Dynamic asset assembly program 150 determines, based on configuring and applying the linkage rules, how the asset may be assembled and how the various asset elements are assembled according to the information desired by the user. The linkage rules may direct the type of domains, soft links, tags, and a level of depth or the number of soft links to include. The order in which the linkage rules may be applied can alter the resulting asset. Receiving the user desired linkage rules from a user using UI 115 via network 110, dynamic asset assembly program 150 sets the appropriate linkage rules for the asset and the order to apply the linkage rules as directed by the user. The linkage rules may take the form of one or more of the following: action (include, exclude, profile), link type (hard, soft, both), domain match (domain1 and domain2), tag match (tag x) or (tag x and tag y), level of indirection which may be an integer 1 to n (defines the depth or number of links associated with an asset element), rule (rule1, rule2), and the precedent or the order in which the linkage rules apply.

Linkage rules taking the form of "action" can determine what action to take for each asset element as determined by the linkage rule set. For example, the action to "include" as determined by the user also defines a link type and a level of indirection, which defines the depth or the number of soft links to include. The level of indirection may identify the depth or the number of linked elements to follow a selected asset element. For example, with a user selected action to "include" applied to an asset with a link type of "soft" and a level of indirection of "one", dynamic asset assembly program 150 configures the asset in the database to include one soft linked asset element for each of the asset elements with associated soft linked asset elements. A linkage rule for the action to "profile", for example, includes profile information such as the link information associated with each of the asset elements selected or the link information for the links to that asset element but, not the asset element link. In an embodiment, the default linkage rule for "action" when no other "action" linkage rules are identified by the user is "exclude".

The linkage rules taking the form of "link type" may identify the type of links the actions may be applied to. For example, a user selected linkage rule for link type "both" with the action "profile" selected directs dynamic asset assembly program 150 to configure the asset elements selected with both hard and soft links to be retrieved with the link information included but, not the actual associated link asset element.

The linkage rules for domain match may include an action that may be applied to hard linked or soft linked asset elements based on the user selected levels of indirection. A linkage rule for domain match would identify asset elements within an asset with the same domain which may be identified by dynamic asset assembly program 150 as system or user provided domains for the linkage rule. An example of a linkage rule executed for a domain match of asset elements in the "security" domain and "technical" domain would ensure that asset elements that apply to both the security as well as the technical domains are eligible for asset assembly. In an embodiment, the default linkage rule for domain match would be none.

In various embodiments, the linkage rules for an element rule are optional. An element rule is a rule that may be applied to one or more selected asset elements. An example of an element rule may be "link asset element xx when asset element c is selected". Element rules will preempt or overrule an action. For dynamic asset assembly program 150, the default for element rules is that no rule exists. A user may enter an element rule as a linkage rule as required for the desired asset assembly upon re-use.

The linkage rules for the level of indirection may identify the depth or the number of levels of indirection which may be the number of linked elements to follow a selected asset element. For example, asset element 03 is selected by the user for inclusion in the asset. Selected asset element 03 has four soft linked asset elements associated with it; a linkage rule applying an action to include two levels of indirection would result in the asset retaining the two closest asset elements soft linked to asset element 03. In an embodiment, dynamic asset assembly program 150 contains a default level of indirection as 1.

The linkage rules may be applied in a specified order or precedent. In an embodiment, the precedent default for dynamic asset assembly program 150 is the order in which the linkage rules are created unless otherwise indicated. A user may specify a different order or precedent by re-arranging the order of the linkage rules in dynamic asset assembly program 150.

An example set of linkage rules created by a user on UI 115 which are sent via network 110 to dynamic asset assembly program 150 in asset system 160 are as follows:
Action: include
Link type: hard
Level of indirection: 2

The linkage rules defined by the user for the selected asset or selected asset elements illustrated above would indicate to dynamic asset assembly program 150 to include the asset elements linked with a hard link to the selected asset elements with a level of indirection of 2 or in other words, follow the links to asset elements for two levels beyond the selected element, include the selected asset element and the two following asset elements linked to the selected asset element but not selected by the user via UI 115.

Another example of linkage rules created by a user on UI 115 and sent via network 110 to dynamic asset assembly program 150 are:
Action: include
Link type: soft
Domain match: "security" & "technical"
Level of indirection: 1

In this example, the asset elements selected would include any asset element that is linked with soft links to the selected asset element and in both the "security" and the "technical" domains. The asset elements associated or linked to the selected asset element and identified in both the "security" and the "technical" domains will be included in the asset when assembled. However, the associated asset elements that are identified in both the "security" and "technical" domains are limited to a level of indirection of 1, therefore, one asset element (not selected by the user but associated with or linked to the selected asset) that follows the selected asset element may be included with the asset as stored in asset database 155 for later re-use.

In step 212, dynamic asset assembly program 150 determines the associated asset elements for inclusion in the asset. Upon applying the linkage rules to the asset elements not selected but associated or linked to the selected asset elements, dynamic asset assembly program 150 determines which of the associated or linked asset elements may be included in the asset. In one embodiment, an asset map depicting the selected asset elements, the associated asset elements included in the asset, the associated asset elements not included in the asset, and the linkage rules including the order in which the rules are applied may be displayed on UI 115 for asset acceptance or further asset customization. The creation of an asset map is discussed further with reference to FIG. 4. Asset customization which may occur in an active field or through icons in the asset map or through use of an icon or tab, for example, a "customize asset" tab displayed by dynamic asset assembly program 150 on a menu on UI 115, may occur by viewing the rules for the asset and initiating changes to either element rules or linkage rules via UI 115.

In step 214, dynamic asset assembly 150 stores the asset in asset database 155. The asset stored in asset database 155 with appropriate associated and linked asset elements may be used for consumption or re-use.

Figure 3:
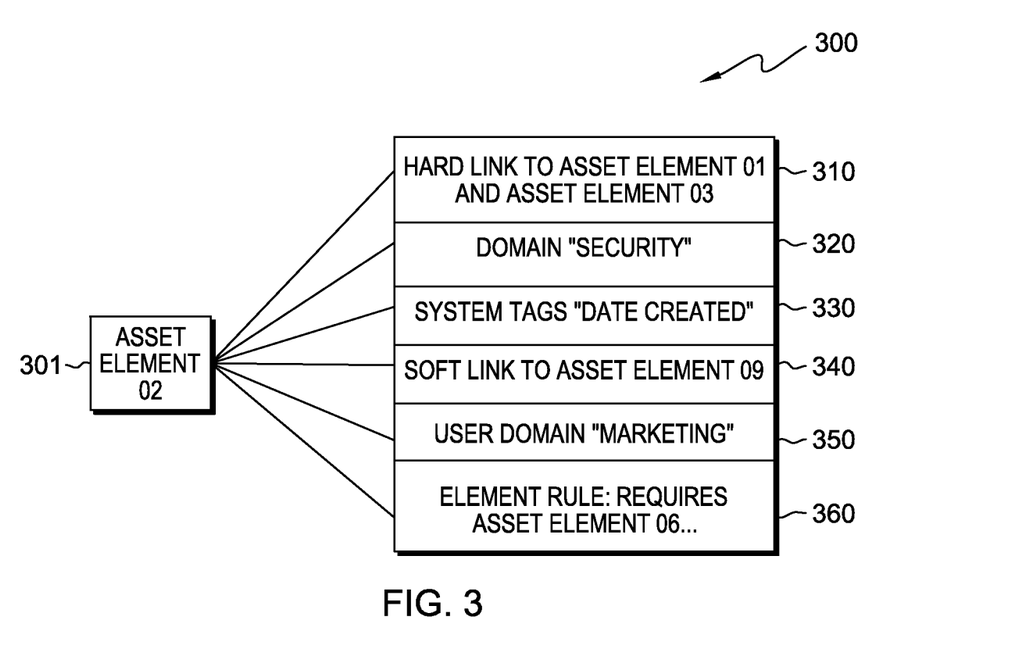
FIG. 3 is a diagram depicting an example of the asset element relationships provided by the dynamic asset assembly program of FIG. 2, in accordance with an embodiment of the present invention.

FIG. 3 is a diagram 300 depicting an example of the asset element relationships provided by dynamic asset assembly program 150, in accordance with an embodiment of the present invention. FIG. 3 is a graphical representation of an example of the hard links, system domains, system tags, soft links, user domains, and element rules that may be identified to dynamic asset assembly program 150 for each of the various asset elements within the asset by the user via UI 115. In FIG. 3, asset element 301 is asset element 02, an asset element which can be selected for asset re-use. Note asset element 301 contains asset element relationships, as discussed in steps 204 through step 208, graphically shown. The depicted asset element relationships selected by the user identify to dynamic asset assembly program 150 how an asset and the associated asset elements may be stored, identified and linked for re-use when retrieved from asset database 155. Hard links 310 are the asset elements with hard links to a selected asset element and are created between selected asset elements. Hard links are initially preserved in the ingestion process but, may be changed later by dynamic asset assembly program 150 when processing the asset with determined rules and rule prioritization at asset assembly. Domain 320, such as "security", may be system domains that may be determined by the system or the user. System tags 330 are attributes such as date or number of uses that can change over time. System tag 330 may be selected as desired by the user. Soft link 340 creates a soft or symbolic link to asset element 09 which is an associated asset element such as another related model or document. Depending on the applied linkage rules for the asset, soft links may become hard links in an asset upon asset assembly. User domains 350 are domains like system domain 320 that can be determined by the user to classify the asset. Assets may be classified by content (what it contains, i.e. marketing data), type (the element format, i.e. filename- .DOC or "DOC" file), or other user defined classifications. Element rules 360 are rules or directives performed on behalf of the asset element whenever the asset element is selected, i.e. select asset element 06 when asset element 02 is used.

Figure 4:
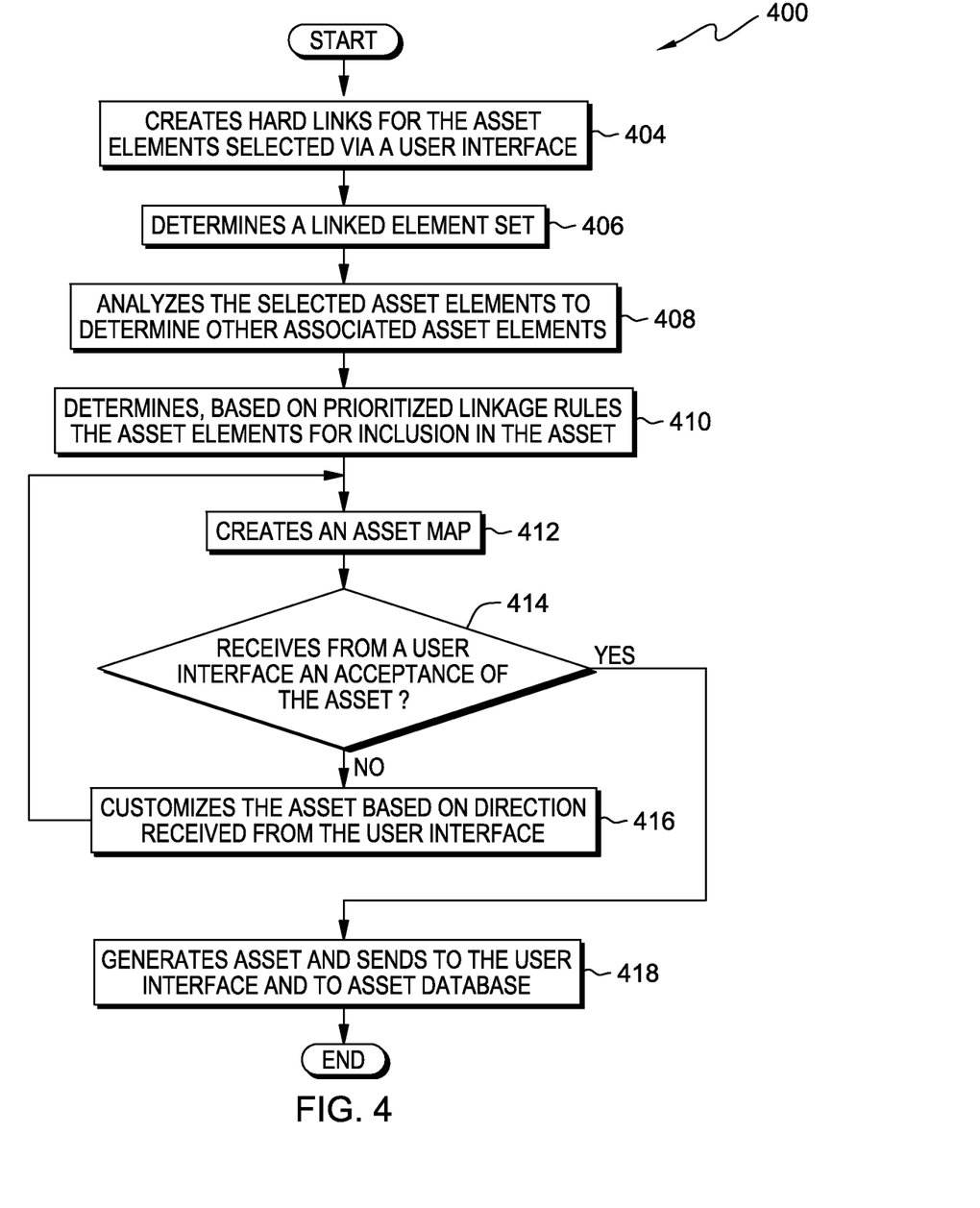
FIG. 4 is a flow chart depicting additional operational steps of a dynamic asset assembly program within the data processing environment of FIG. 1, to create an asset by re-using asset elements with a rule based methodology, in accordance with an embodiment of the present invention.

FIG. 4 is a flow chart 400 depicting additional operational steps of dynamic asset assembly program 150 within data processing environment 100, to create an asset by re-using asset elements with a rule based methodology, in accordance with an embodiment of the present invention. Dynamic asset assembly program 150 automatically creates a new asset by re-using the existing asset elements as retrieved from asset database 155 with associated asset elements identified by domains, links, element rules and tags. Dynamic asset assembly program 150 automatically determines the asset using a rule driven engine or process that utilizes a prioritized list of linkage rules to determine what to do with the asset elements associated with the selected asset elements. In various embodiments, the operational steps depicted in FIG. 2 and FIG. 4 may be performed by one program or multiple programs.

In step 404, dynamic asset assembly program 150 creates hard links for asset elements selected via a user interface. Dynamic asset assembly program 150 receives a selection of asset elements for a new asset from a user via UI 115 and retrieves the asset elements associated with the selected asset element by links, domains, tags and element rules from asset database 155. The user selects asset elements from one or more assets in asset database 155 by clicking on or highlighting the asset element, for example, in an asset element listing of asset elements stored in asset database 155. Dynamic asset assembly program 150 creates hard links for selected asset elements which form an initial asset element set.

In step 406, dynamic asset assembly program 150 determines a linked asset element set. Dynamic asset assembly program 150 processes the initial asset element set of user selected asset elements to determine asset elements not selected but, which are hard linked to the initial, user selected asset elements. The linked data element set includes the asset elements hard linked to the selected asset elements.

In step 408, dynamic asset assembly program 150 analyzes the selected asset elements to determine other associated asset elements. The other associated asset elements include asset elements associated to the selected asset elements by one or more other relationships such as soft links, element rules, domains or tags. The linked asset element set may be augmented and included with the associated asset elements for possible inclusion in the asset assembly.

In step 410, dynamic asset assembly program 150 determines, based on prioritized linkage rules, the asset elements for inclusion in the asset. In an embodiment, dynamic asset assembly program 150 applies the linkage rules in the priority order received, via UI 115 from the user creating the asset, to each selected asset element to determine the linked asset elements and the associated asset elements to include in the asset. The associated asset elements included in the asset by dynamic asset assembly program 150 and the relationships or linkages (soft or hard links) in the asset may be determined with the application of the linkage rules to each selected asset element. In another embodiment, a user may pre-define a priority for linkage rules, for example, element rules always have a higher priority than soft links in determining associated asset elements.

In step 412, dynamic asset assembly program 150 creates an asset map. An asset map visually displays on UI 115, for example, the asset elements selected by the user for the asset assembly, the associated asset elements included in the asset or user for augmenting the asset, the associated asset elements not included or removed from the asset, and the rules used to determine the asset. Dynamic asset assembly program 150 analyzes the asset elements initially hard linked to the selected asset elements and the asset elements associated to the selected asset elements by soft links, domains or tags to determine, based on provided linkage rules, the asset elements for inclusion in the asset assembly and display on the asset map. The asset map displays the selected asset elements, the included associated asset elements, the excluded asset elements and the rules used to determine the asset map. The asset map provides a visualization of the final asset assembly and provides the user with the ability to see the rules used for asset creation. For example, a user may click on a box depicting an element rule to see asset elements to which it would apply.

In step 414, dynamic asset assembly program 150 receives, from a user interface, an acceptance of the asset. The asset map, in addition to displaying the asset elements for inclusion in the asset, provides capability for acceptance of the asset for finalization and further asset customization of the associated asset elements for inclusion in the asset. Finalization of the asset may include generation and storage of the asset, for example, in asset database 155. Dynamic asset assembly program 150 receives a user acceptance of the asset as displayed with the asset map (the "YES" branch of step 414). In the exemplary embodiment, user acceptance occurs when a user selects "generate" on the asset map to generate the finalized asset. In another embodiment, a user may accept the asset from a tab or icon, for example, "create asset" from another location, display screen or menu within dynamic asset assembly program 150 or as displayed on UI 115.

If dynamic asset assembly program 150 does not receive user acceptance of the asset (the "NO" branch of step 414), dynamic asset assembly program 150 customizes, in step 416, the asset based on direction received from a user via UI 115. In response to inputs received from a user, dynamic asset assembly program 150 customizes the asset map by changing the rules for the asset as directed by user input and thus, altering the resulting asset to match the user's desired asset assembly. The asset may be further customized by changing element rules displayed in the asset map or by changing the linkage rules utilizing, for example, icons, tabs or a cursor to reject, augment or move linkage rules within the asset map. A change, such as moving a linkage rule, would change the order in which the linkage rules are applied. The change in order or priority of the linkage rules results in a different created asset when the linkage rules are applied. In other embodiments, input for changes to the linkage rules or element rules for customization of the asset may occur from another location in dynamic asset assembly program 150 such as an icon in a menu or programmatically received via an active field on program display screen.

In the exemplary embodiment, dynamic asset assembly 150 may receive via UI 115 changes to linkage rules or element rules used to determine asset elements not selected by the user but, included in the finalized asset. In an embodiment of the present invention, the changes to the linkage rules or element rules may be received by dynamic asset assembly program 150 from input received from UI 115 while displaying the asset map. In the asset map, dynamic asset assembly program 150 may receive from UI 115 changes using arrows, cursors or other icons denoting moves, rejections of linkage rules or additions to the linkage rules or element rules displayed in the asset map. Upon receiving input for changes to the linkage rules, dynamic asset assembly program 150 returns to step 412 to create a new asset map for user acceptance via UI 115. In an embodiment, in response to a selection of a tab such as "refresh" from UI 115, at any time in the asset map, dynamic asset assembly program 150 creates a new asset map and continues on to step 414. In other embodiments, the request for an asset map generation may be typed in an active line or be requested using, for example, an icon selected from another location or menu in dynamic asset assembly program 150.

In step 418, dynamic asset assembly program 150 generates the asset and sends to the user interface and to the asset database. Upon receiving user acceptance of the asset map, dynamic asset assembly program 150 generates the asset and sends the asset to the user on computer 101 and to asset database 155. In other embodiments, dynamic asset assembly program 150 may receive acceptance of the asset for assembly by a command or selection of an icon in the program. In one embodiment, dynamic asset assembly program 150 may receive from the user interface a request to send the asset to another user or users upon asset generation. In another embodiment, dynamic asset assembly program 150 may store the created asset in asset database 155 for later use by the user.

Figure 5:
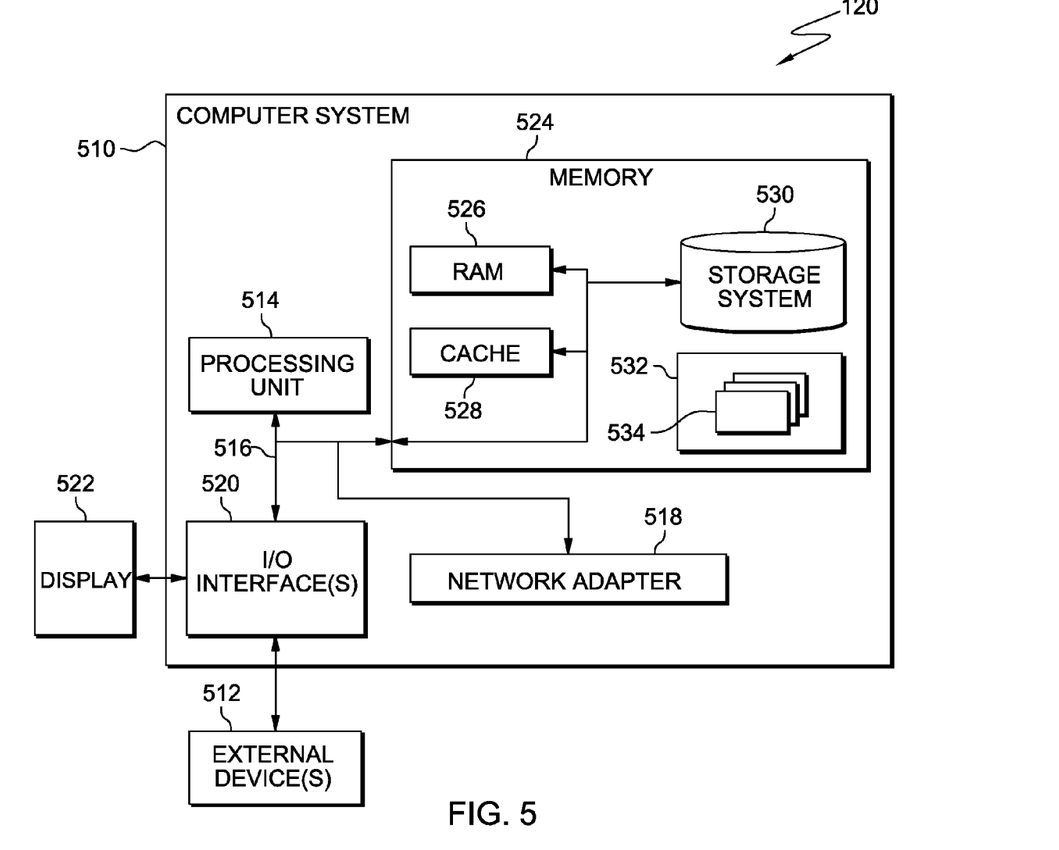
FIG. 5 depicts a block diagram of the components of a computer, such as the server depicted in FIG. 1, in accordance with one embodiment of the present invention.

FIG. 5 depicts a block diagram of the components of server 120, in accordance with one embodiment of the present invention. It should be appreciated that FIG. 5 provides only an illustration of one implementation and does not imply any limitations with regard to the environments in which different embodiments may be implemented.

Server 120 includes the components shown in computer system 510. In the illustrative embodiment, server 120 in the data processing environment 100 is shown in the form of a computer system 510 however, the capabilities provided by server 120 may be provided by a remote computer, a server, or a cloud of distributed computing devices. The components of computer system 510 may include, but are not limited to, one or more processors or processing units 514, a system memory 524, and a bus 516 that couples various system components including system memory 524 to processor 514.

Bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 510 typically includes a variety of computer system readable media. Such media may be any available media that is accessible by computer system 510, and it includes both volatile and non-volatile media, removable and non-removable media.

System memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 516 by one or more data media interfaces. As will be further depicted and described below, system memory 524 may include at least one computer program product having a set (e.g., at least one) of program modules that are configured to carry out the functions of embodiments of the invention.

Program 532, having one or more sets of program modules 534, may be stored in memory 524 by way of example, and not limitation, as well as an operating system, one or more application programs, other program modules, and program data. Each of the operating systems, one or more application programs, other program modules, and program data, or some combination thereof, may include an implementation of a networking environment. Program modules 534 generally carry out the functions and/or methodologies of embodiments of the invention as described herein. Computer system 510 may also communicate with one or more external devices 512 such as a keyboard, a cell phone, a pointing device, a display 522, etc., or one or more devices that enable a user to interact with computer system 510 and any devices (e.g., network card, modem, etc.) that enable computer system 510 to communicate with one or more other computing devices. Such communication can occur via Input/Output (I/O) interface(s) 520. Yet still, computer system 510 can communicate with one or more networks such as a local area network (LAN), a general wide area network (WAN), and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives, and data archival storage systems may be used in conjunction with computer system 510.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating an asset, the method comprising:
   receiving, by one or more computer processors, a selection of at least one asset element;
   determining, by one or more computer processors, whether one or more asset elements associated with the at least one selected asset element exist;
   responsive to determining the one or more asset elements associated with the at least one selected asset element exist, determining, by one or more computer processors, based, at least in part, on one or more linkage rules, whether at least one of the one or more associated asset elements is included in an asset, wherein the one or more linkage rules include one or more of an action, a link type, a domain match, a tag match, a number of linked asset elements, and a prioritized order for application of the linkage rules; and
   responsive to determining that the at least one of the one or more associated asset elements is included in the asset, generating, by one or more computer processors, an asset map for the asset depicting the one or more linkage rules, the at least one selected asset element, the one or more asset elements associated with the at least one selected asset element, and the at least one of the one or more associated asset elements included in the asset.

2. The method of claim 1, further comprising:
   generating, by one or more computer processors, based, at least in part, on the asset map, the asset including the at least one selected asset element and the at least one of the one or more associated asset elements included in the asset.

3. The method of claim 1, wherein determining, by one or more computer processors, whether one or more asset elements associated with the at least one selected asset element exist further comprises:
   determining, by one or more computer processors, whether a hard link exists between the at least one selected asset element and one or more additional asset elements; and
   responsive to determining the hard link exists, associating, by one or more computer processors, the at least one selected asset element with the one or more additional asset elements.

4. The method of claim 1, wherein determining, by one or more computer processors, whether one or more asset elements associated with the at least one selected asset element exist further comprises determining, by one or more computer processors, whether one or more other asset elements are associated with the at least one selected asset element based, at least in part, on one or more of an element rule, a soft link, a domain, and a tag.

5. The method of claim 1, wherein receiving a selection of the at least one selected asset element, further comprises creating, by one or more computer processors, a hard link between the at least one selected asset elements.

6. The method of claim 1, further comprising, determining, by one or more computer processors, whether a user accepts the asset map and, in response to determining the user accepts the asset map, generating, by one or more computer processors, the asset.

7. The method of claim 1, further comprising:
   receiving, by one or more computer processors, a customization of the asset map, the customization based, at least in part, on one or more changes to the one or more linkage rules; and
   responsive to receiving the customization of the asset map, generating, by one or more computer processors, a new asset map.

8. The method of claim 1, wherein determining based, at least in part, on one or more linkage rules, whether the one or more associated asset elements is included in the asset further comprises:
   receiving, by one or more computer processors, a user selection of one or more linkage rules in a linkage rule set;
   applying, by one or more computer processors, the selected one or more linkage rules in the order selected; and
   creating, by one or computer processors, the asset based, at least in part, on an application of the linkage rules in the linkage rule set.

9. The method of claim 1, wherein a linkage rule action in the one or more linkage rules includes at least one linkage rule action of include, exclude, and profile, and wherein the action of include determines one or more asset elements of the one or more associated asset elements determined by the one or more linkage rules is included in the asset, the action of exclude determines one or more asset elements of the one or more associated asset elements determined by the one or more linkage rules excluded from the asset, and the action of profile determines one or more asset elements of the one or more associated asset elements determined by the one or more linkage rules not included in the asset while including one or more links to the one or more asset elements not included in the asset.

10. A computer program product for creating an asset, the computer program product comprising:

one or more computer readable hardware storage devices and program instructions stored on the one or more computer readable hardware storage device, the program instructions comprising:

program instructions to receive a selection of at least one asset element;

program instructions to determine whether one or more asset elements associated with the at least one selected asset element exist;

responsive to determining the one or more asset elements associated with the at least one selected asset element exist, program instructions to determine, based, at least in part, on one or more linkage rules, whether at least one of the one or more associated asset elements is included in an asset, wherein the one or more linkage rules include one or more of an action, a link type, a domain match, a tag match, a number of linked asset elements, and a prioritized order for application of the linkage rules; and responsive to determining that the at least one of the one or more associated asset elements is included in the asset, program instructions to generate an asset map for the asset depicting the one or more linkage rules, the at least one selected asset element, the one or more asset elements associated with the at least one selected asset element, and the at least one of the one or more associated asset elements included in the asset.

11. The computer program product of claim 10, further comprises:

program instructions to generate, based, at least in part, on the asset map, the asset including the at least one selected asset element and the at least one of the one or more associated asset elements included in the asset.

12. The computer program product of claim 10, wherein program instructions to whether one or more asset elements associated with the at least one selected asset element exist further comprises:

program instructions to determine whether a hard link exists between the at least one selected asset element and one or more additional asset elements; and responsive to determining the hard link exists, program instructions to associate the at least one selected asset element with the one or more additional asset elements.

13. The computer program product of claim 10, wherein program instructions to determine whether one or more asset elements associated with the at least one selected asset element exist further comprises:

program instructions to determine, based, at least in part, on one or more of an element rule, a soft link, a domain, and a tag.

14. The computer program product of claim 10, wherein program instructions to receive the at least one selected asset element further comprises program instructions to determine whether one or more other asset elements are associated with the at least one selected asset element based, at least in part, on one or more of a domain, a tag, a rule, and a soft link is received for the at least one selected asset element.

15. The computer program product of claim 10, further comprising program instructions to determine whether a user accepts the asset map and, in response to determining the user accepts the asset map, program instructions to generate the asset.

16. The computer program product of claim 10, further comprising:

program instructions to receive a customization of the asset map, the customization based, at least in part, on one or more changes to the one or more linkage rules; and responsive to receiving the customization of the asset map, program instructions to generate a new asset map.

17. A computer system for creating an asset, the computer system comprising:

one or more computer processors;

one or more computer readable hardware storage device;

program instructions stored on at least one of the one or more computer readable hardware storage device for execution by at least one of the one or more computer processors, the program instructions comprising:

program instructions to receive a selection of at least one asset element;

program instructions to determine whether one or more asset elements associated with the at least one selected asset element exist;

responsive to determining the one or more asset elements associated with the at least one selected asset element exist, program instructions to determine, based, at least in part, on one or more linkage rules, whether at least one of the one or more associated asset elements is included in an asset, wherein the one or more linkage rules include one or more of an action, a link type, a domain match, a tag match, a number of linked asset elements, and a prioritized order for application of the linkage rules; and responsive to determining that the at least one of the one or more associated asset elements is included in the asset, program instructions to generate an asset map for the asset depicting the one or more linkage rules, the at least one selected asset element, the one or more asset elements associated with the at least one selected asset element, and the at least one of the one or more associated asset elements included in the asset.

18. The computer system of claim 17, further comprises:

program instructions to generate, based, at least in part, on the asset map, the asset including the at least one selected asset element and the at least one of the one or more associated asset elements included in the asset.

19. The computer system of claim 17, further comprising program instructions to determine whether a user accepts the asset map and, in response to determining the user accepts the asset map, program instructions to generate the asset.

20. The computer system of claim 17, further comprising:

program instructions to receive a customization of the asset map, the customization based, at least in part, on one or more changes to the one or more linkage rules; and responsive to receiving the customization of the asset map, program instructions to generate a new asset map.

\* \* \* \* \*